(12) United States Patent
Jo

(10) Patent No.: US 11,240,002 B2
(45) Date of Patent: Feb. 1, 2022

(54) RESOURCE OPERATING METHOD FOR EACH OF NODES COMMUNICATING THROUGH NETWORK AND COMPUTER DEVICE OPERATING AS ONE OF NODES

(71) Applicant: NHN Entertainment Corporation, Seongnam-si (KR)

(72) Inventor: Youngjun Jo, Seongnam-si (KR)

(73) Assignee: NHN Entertainment Corporation, Seongnam-si (KR)

(*) Notice: Subject to any disclaimer, the term of this patent is extended or adjusted under 35 U.S.C. 154(b) by 591 days.

(21) Appl. No.: 16/217,047

(22) Filed: Dec. 12, 2018

(65) Prior Publication Data
US 2019/0182030 A1    Jun. 13, 2019

(30) Foreign Application Priority Data

Dec. 12, 2017 (KR) .................. 10-2017-0170721

(51) Int. Cl.
*H04L 9/06* (2006.01)
*H04L 9/12* (2006.01)
(Continued)

(52) U.S. Cl.
CPC ............ *H04L 9/0637* (2013.01); *G06F 9/466* (2013.01); *G06N 20/00* (2019.01); *G06Q 20/065* (2013.01);
(Continued)

(58) Field of Classification Search
CPC ... G06F 21/6227; G06F 9/466; H04L 9/0637; H04L 9/0643; H04L 9/12; H04L 2209/38;
(Continued)

(56) References Cited

U.S. PATENT DOCUMENTS

2016/0342977 A1* 11/2016 Lam ................... G06Q 20/0658
2017/0005804 A1    1/2017 Zinder
(Continued)

FOREIGN PATENT DOCUMENTS

| CN | 106571925 A | * | 4/2017 | ............... H04L 9/16 |
| KR | 10-2011-0124088 |  | 11/2011 | |
| KR | 10-2017-0040079 |  | 4/2017 | |

OTHER PUBLICATIONS

Satoshi Nakamoto, "Bitcoin: A Peer-to-Peer Electronic Cash System", 2008, available at https://bitcoin.org/bitcoin.pdf.
(Continued)

*Primary Examiner* — Paul E Callahan
(74) *Attorney, Agent, or Firm* — H.C. Park & Associates, PLC

(57) ABSTRACT

A resource operating method for each of plurality of nodes communicating through a network includes: receiving a problem through a mining program, and performing a proof-of-work process to solve the received problem; generating a transaction and transmitting the generated transaction to the plurality of nodes; receiving a transaction and a block hash value from the plurality of nodes; stopping the proof-of-work process; verifying validity of the generated or received transaction using the block hash value, and creating, in response to the transaction being verified, a block including information of the verified transaction; receiving a reward corresponding to the performed proof-of-work process through the mining program; and connecting the block to a blockchain.

17 Claims, 5 Drawing Sheets

(51) Int. Cl.
  *G06F 9/46*     (2006.01)
  *G06Q 20/06*    (2012.01)
  *G06N 20/00*    (2019.01)
  *G06Q 30/02*    (2012.01)

(52) U.S. Cl.
  CPC ....... *G06Q 30/0217* (2013.01); *H04L 9/0643* (2013.01); *H04L 9/12* (2013.01); *H04L 2209/38* (2013.01); *H04L 2209/56* (2013.01)

(58) Field of Classification Search
  CPC .. H04L 2209/56; G06N 20/60; G06Q 20/065; G06Q 30/0217
  See application file for complete search history.

(56) References Cited

U.S. PATENT DOCUMENTS

| | | |
|---|---|---|
| 2017/0103458 A1 | 4/2017 | Pierce et al. |
| 2017/0285720 A1 | 10/2017 | Shah |
| 2019/0306176 A1* | 10/2019 | Gleichauf ............. H04L 63/123 |
| 2021/0150416 A1* | 5/2021 | Ghanea-Hercock ......................... G06K 9/6257 |

OTHER PUBLICATIONS

Nakayama et al., Blockchain System Aiming for Effective Use of Computing Resources, pp. 1-7, vol. 2017-CSEC-079 No. 6, Dec. 4, 2017.

The Golem Project Crowdfunding Whitepaper, pp. 1-28, Nov. 2016, available at https://golem.network/crowdfunding/Golemwhitepaper.pdf.

* cited by examiner

RESOURCE OPERATING METHOD FOR EACH OF NODES COMMUNICATING THROUGH NETWORK AND COMPUTER DEVICE OPERATING AS ONE OF NODES

CROSS REFERENCE TO RELATED APPLICATION

This application claims priority from and the benefit of Korean Patent Application No. 10-2017-0170721, filed on Dec. 12, 2017, which is hereby incorporated by reference for all purposes as if fully set forth herein.

BACKGROUND

Field

Exemplary embodiments/implementations of the invention relate generally to an electronic device and, more specifically, to a resource operating method for each of nodes communicating through a network and a computer device operating as one of the nodes.

Discussion of the Background

A blockchain uses a method that allows a plurality of participants to share data and thus prevents or reduces the data from being faked. The blockchain can be applied to Bitcoin that is a representative online virtual currency. Bitcoin records transactions in a ledger which is open to anyone, and a plurality of participants using Bitcoin verify the transactions at predetermined time intervals, thereby preventing or reduce the risk of hacking. That is, the blockchain includes a decentralized structure in which all network participants share and store transactions. The paper of Satoshi Nakamoto published in 2008, "Bitcoin: A Peer-to-Peer Electronic Cash System," suggests P2P electronic money with no central financial institution involved. The paper suggests a method that solves a double spending problem using a cryptographic function, and gives incentives to decentralized nodes participating in the process through a mining process.

When a blockchain is created, a blockchain based on a proof-of-work system verifies and approves transactions and blocks through mining, the blocks each corresponding to a group of transactions. Participants or nodes need to provide computer resources to a network and solve a problem using an enormous amount of computing power, in order to acquire an authority to create a block.

That is, according to the proof-of-work system, a miner who first receives an approval using a high-performance computer can receive a reward. Therefore, the miner needs to use a high-performance graphic card requiring a high electric rate, in order to obtain more coins than other miners. Such a system heightens the competition among miners while requiring excessive electric rates, and causes energy waste and environmental problems.

The above information disclosed in this Background section is only for understanding of the background of the inventive concepts, and, therefore, it may contain information that does not constitute prior art.

SUMMARY

Methods according to exemplary implementations of the invention are capable of providing a resource operating method for each of nodes communicating through a network, which can prevent or reduce the waste of computer resources by using computing power used for a blockchain mining process based on a proof of work in machine learning and compensating for the computing power, and a computer device operating as one of the nodes.

Additional features of the inventive concepts will be set forth in the description which follows, and in part will be apparent from the description, or may be learned by practice of the inventive concepts.

According to one or more embodiments of the invention, a resource operating method for each of a plurality of nodes communicating through a network includes: receiving a problem through a mining program, and performing a proof-of-work process to solve the received problem; generating a transaction and transmitting the generated transaction to the plurality of nodes; receiving a transaction and a block hash value from the plurality of nodes; stopping the proof-of-work process; verifying validity of the generated or received transaction using the block hash value; creating, in response to the transaction being verified, a block including information of the verified transaction; receiving a reward corresponding to the performed proof-of-work process through the mining program; and connecting the block to a blockchain.

The resource operating method may further include storing the blockchain composed of blocks including block hash values.

The receiving of the problem through the mining program may include performing machine learning to solve a problem corresponding to the machine learning through the mining program.

The receiving of the reward corresponding to the performed proof-of-work process through the mining program may include receiving a reward in proportion to the work amount of the proof-of-work process until the proof-of-work process is stopped.

The receiving of the reward corresponding to the performed proof-of-work process through the mining program may include receiving a reward when the work amount of the proof-of-work process until the proof-of-work process is stopped is larger than a predefined minimum work amount.

The minimum work amount may be ½ of the work amount of a proof-of-work process performed by a node which first generates a block hash value among the plurality of nodes.

The receiving of the reward corresponding to the performed proof-of-work process through the mining program may include receiving a crypto-currency corresponding to the performed proof-of-work process through the mining program.

The receiving of the problem through the mining program may include receiving the problem through the mining program after generating the previous block, and performing a proof-of-work process.

In an another exemplary embodiment, a resource operating method for each of a plurality of nodes communicating through a network includes: performing machine learning to solve a problem corresponding to the machine learning through a mining program; generating a transaction and transmitting the generated transaction to the plurality of nodes; receiving a transaction from the plurality of nodes; generating a block hash value, and creating a block for information of the generated or received transaction using the generated block hash value; transmitting the block hash value to the plurality of nodes; receiving a reward corresponding to the performed machine learning through the mining program; and connecting the block to a blockchain.

The resource operating method may further include storing the blockchain composed of blocks including block hash values.

The receiving of the reward corresponding to the performed machine learning through the mining program may include receiving a crypto-currency corresponding to the performed machine learning through the mining program.

According to one or more embodiments of the invention, a computer device operating as any one of a plurality of nodes communicating through a network includes: a communicator configured to communicate with the network; and one or more processors connected to the communicator, wherein the one or more processors are configured to: receive a program through a mining program and perform a proof-of-work process to solve the received problem; generate a transaction and transmit the generated transaction to the plurality of nodes; receive a transaction and a block hash value from the plurality of nodes; stop the proof-of-work process; verify validity of the generated or received transaction using the block hash value; create a block when the validity is verified; receive a reward corresponding to the performed proof-of-work process through the mining program; and connect the block to a blockchain.

The problem may include a problem corresponding to machine learning, and the proof-of-work process may include machine learning.

The reward corresponding to the performed proof-of-work process may include a crypto-currency.

According to one or more embodiments of the invention, a computer device operating as any one of a plurality of nodes communicating through a network includes: a communicator configured to communicate with the network; and one or more processors connected to the communicator, wherein the one or more processors are configured to: perform machine learning to solve a problem corresponding to the machine learning through a mining program; generate a transaction and transmit the generated transaction to the plurality of nodes; receive a transaction from the plurality of nodes; generate a block hash value, and create a block for information of the generated or received transaction using the generated block hash value; transmit the block hash value to the plurality of nodes; receive a reward corresponding to the performed machine learning through the mining program; and connect the block to a blockchain.

The reward corresponding to the performed machine learning may include a crypto-currency.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
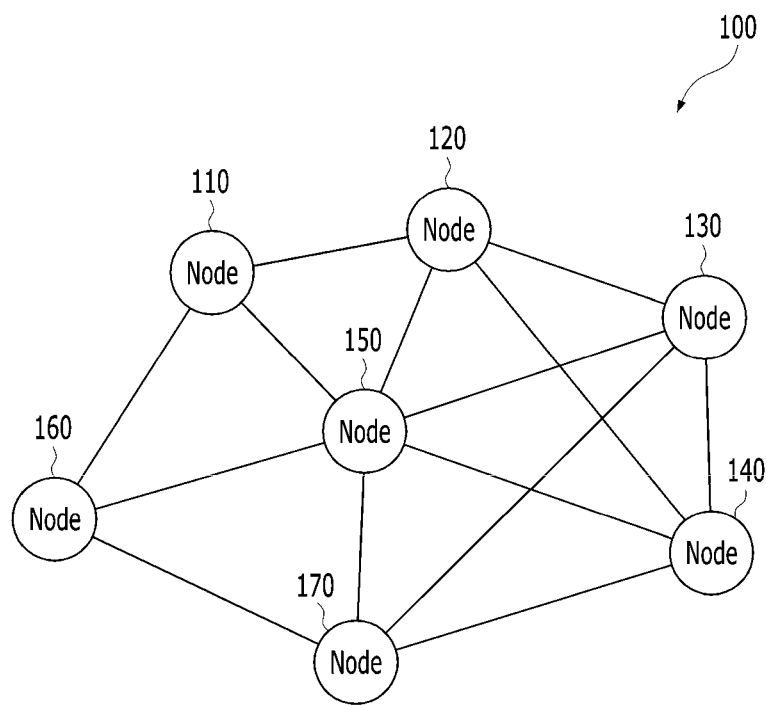
FIG. 1 is a block diagram illustrating a blockchain system according to exemplary embodiments.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element or layer, it may be directly on, connected to, or coupled to the other element or layer or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The foregoing of the related art is intended merely to aid in the understanding of the background of the present invention, and not intended to mean that the present invention falls within the purview of the related art that is already known to those skilled in the art.

In the following descriptions, specific details will be suggested to promote the understanding of various embodiments. However, it is obvious that the various embodiments can be provided without such specific details or in the same manner as one or more details. In other examples, publicly known structures and devices are illustrated as block diagrams in order to avoid making it unnecessarily difficult to understand various embodiments.

FIG. 1 is a block diagram illustrating a blockchain system 100 according to exemplary embodiments.

Referring to FIG. 1, the blockchain system 100 is a decentralized network system including a plurality of nodes 110, 120, 130, 140 150, 160, and 170. The nodes 110, 120, 130, 140 150, 160, and 170 of the decentralized network system are electronic devices with a computing ability, such as computers, mobile terminals and dedicated electronic devices. In an exemplary embodiment, the nodes 110, 120, 130, 140 150, 160, and 170 may indicate persons or computers that download a blockchain with software for distributing the blockchain.

The blockchain system 100 may store information which is commonly known to all of the nodes 110, 120, 130, 140 150, 160, and 170 within a connected group of data blocks, which is referred to as a blockchain. The plurality of nodes 110, 120, 130, 140 150, 160, and 170 may store the same blockchain including the same data blocks by performing communication with one another. The plurality of nodes 110, 120, 130, 140 150, 160, and 170 may be full nodes which store a blockchain, create and spread a new data block, verify the received new data block, and update the blockchain by including the new data block in the blockchain. For example, each of the full nodes is a node which can store the entire blockchain and give its block information to another node through connection with the another node.

Although it has been described that the nodes 110, 120, 130, 140 150, 160, and 170 are full nodes, the exemplary embodiments are not limited thereto. At least some of the plurality of nodes 110, 120, 130, 140 150, 160, and 170 may be lightweight nodes. For example, each of the lightweight nodes stores a user's wallet, but relies on a server owned by a third party in order to access the blockchain network, and does not store a copy of the blockchain.

Whenever creating a new data block, each of the nodes 110, 120, 130, 140 150, 160, and 170 may share the new data block with the other nodes. Thus, the plurality of nodes 110, 120, 130, 140 150, 160, and 170 may store the same blockchain including the same data blocks. The nodes receiving a new data block may verify the new data block and create a consensus of whether to include the new data block in the blockchain. Depending on the verification result, the plurality of nodes 110, 120, 130, 140 150, 160, and 170 may update the blockchain. In this way, the plurality of nodes 110, 120, 130, 140 150, 160, and 170 may store the same blockchain.

Figure 2:
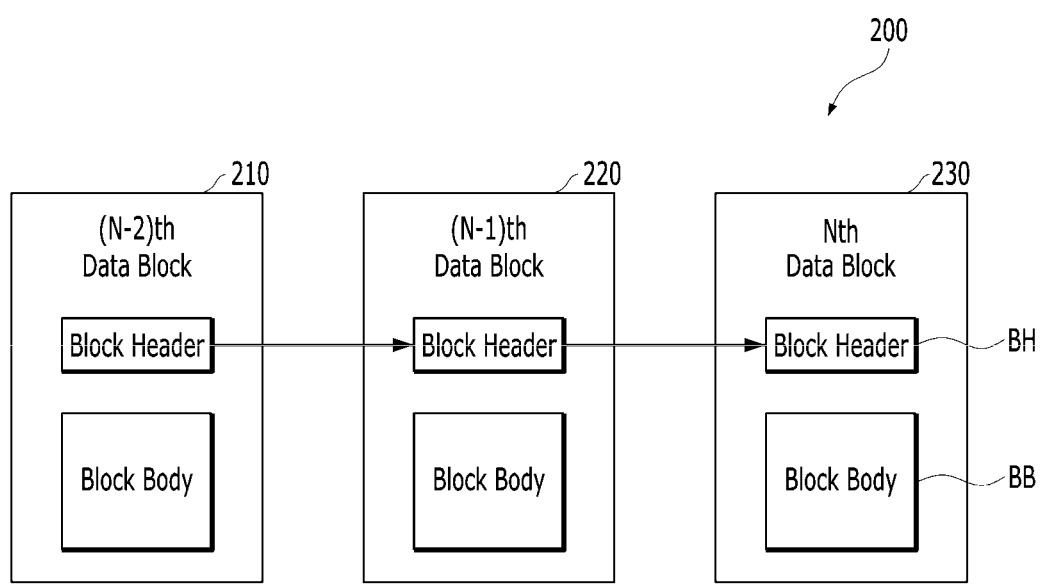
FIG. 2 is a conceptual view illustrating a blockchain according to an exemplary embodiment.

FIG. 2 is a conceptual view illustrating a blockchain 200 according to an exemplary embodiment.

Referring to FIG. 2, the blockchain 200 may include data blocks 210, 220, and 230 which are sequentially connected. The blockchain 200 may be created through the following process: each of the nodes included in the blockchain system 100 creates a new data block, shares the created new data block, and links the shared data block to the blockchain 200. FIG. 2 illustrates three data blocks 210, 220, and 230, but the number of data blocks which can be included in the blockchain 200 is not limited thereto.

Each of the data blocks 210, 220, and 230 includes a block header BH and a block body BB. Since the block header BH contains the hash value of the previous block header BH, all of the blocks are connected like a kind of chain in a linked list manner. Furthermore, the block header BH may include an arbitrary nonce value used for a consensus algorithm and a difficulty level target (nBits) value for adjusting the difficulty level of the block creation. The block header BH may contain the hash value of the previous data block in order to indicate the connection relationship between the data blocks. For example, the block header BH of the (N−1)th data block 220 may include the hash value contained in the block header BH of the previous data block 210. During a process of verifying whether the blockchain 200 is valid, the hash value contained in the block header BH may be used. The block body BB may contain a different value depending on a service to be supported. For example, in Bitcoin that is a digital crypto-currency system, transactions among users which occur for 10 minutes are included in the block body BB.

Figure 3:
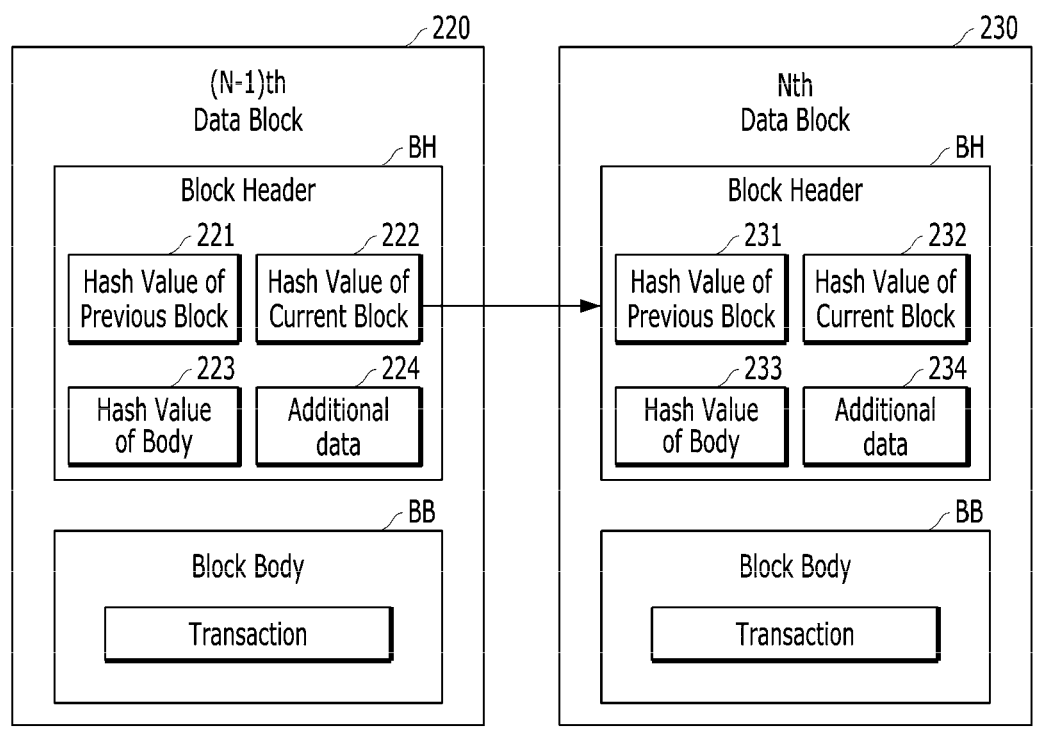
FIG. 3 is a conceptual view illustrating some of data blocks in the blockchain of FIG. 2 in more detail.

FIG. 3 is a conceptual view illustrating some of the data blocks of the blockchain 200 of FIG. 2 in more detail.

Referring to FIGS. 2 and 3, the block headers BH of the respective data blocks may include the hash values 221 and 231 of the previous data blocks, the hash values 222 and 232 of the current data blocks and the hash values 223 and 233 of the bodies.

The data blocks 210, 220, and 230 may be connected based on the hash values. The hash value of the previous data block, included in the block header BH of the Nth data block 230, is equal to the hash value of the current data block, included in the block header BH of the (N−1)th data block 220 corresponding to the previous data block. In this way, the data blocks are connected like a chain by including the hash values of the previous data blocks in their block headers BH. The nodes 110, 120, 130, 140 150, 160, and 170 participating in the blockchain system 100 may verify the validities of the data blocks 210, 220, and 230 based on the hash values of the previous data blocks, included in the respective data blocks 210, 220, and 230. Thus, it is significantly difficult to counterfeit or falsify the contents of a data block which is already created and included in the blockchain 200.

The hash values 223 and 233 of the bodies of the block headers BH may indicate the headers of the corresponding block bodies BB.

The block header BH may further include additional data 224 and 234. For example, each of the additional data 224 and 234 may include a time stamp indicating a point of time that the corresponding data block was created.

The block body BB includes information on transactions. The plurality of nodes 110, 120, 130, 140 150, 160, and 170 store the same data blocks 210, 220, and 230. Although the data blocks 210, 220, and 230 stored in an arbitrary node (for example, the node 110) among the plurality of nodes 110, 120, 130, 140 150, 160, and 170 are counterfeited or falsified, the counterfeit or falsification may be easily distinguished because the data blocks 210, 220, and 230 stored in the corresponding node are different from the data blocks 210, 220, and 230 of the other nodes. Therefore, since the information on the transactions within the block bodies BB of the data blocks 210, 220, and 230 is difficult to arbitrarily change, the information has relatively high reliability.

According to comparative technology in which information on transactions is stored in a central server managed by a specific manager, the information corresponding to the transactions may be arbitrarily faked according to the necessity of the manager, or faked by hacking. According to the exemplary embodiment, however, the information on the transactions may be stored in the blockchain 200, and thus shared by the plurality of nodes 110, 120, 130, 140 150, 160, and 170, which makes it possible to reduce the possibility that the information corresponding to the transactions will be arbitrarily changed by someone. As described above, each of the nodes 110, 120, 130, 140 150, 160, and 170 may verify the validities of the data blocks 210, 220, and 230 based on the hash values of the previous data blocks, included in the respective data blocks 210, 220, and 230. Therefore, the contents of a data block which has been already created by someone, that is, the information on transactions within the block body BB are difficult to counterfeit or falsify. Thus, the information stored in the blockchain 200 may have high or improved reliability.

Figure 4:
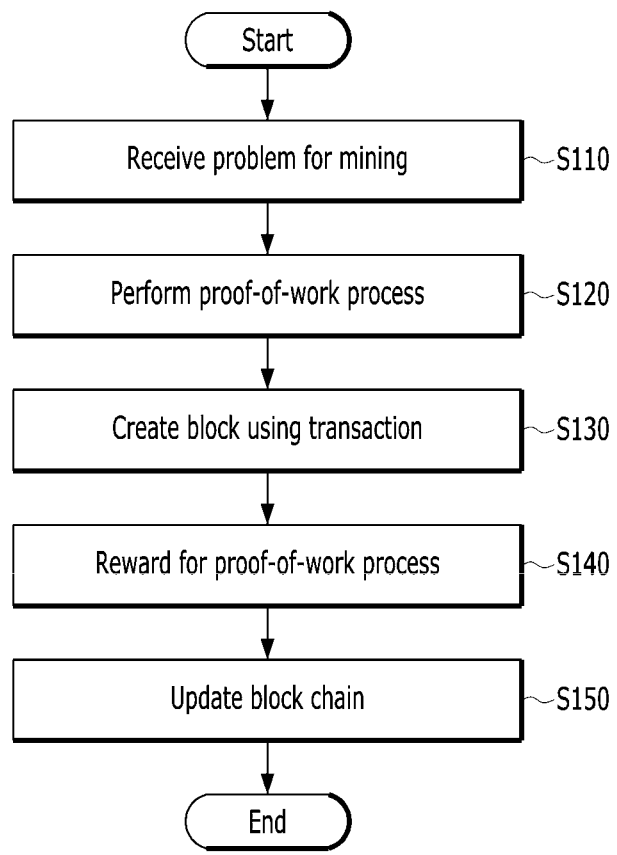
FIG. 4 is a flowchart illustrating a method for updating a blockchain in any one of a plurality of nodes according to an exemplary embodiment.

FIG. 4 is a flowchart illustrating a method for updating a blockchain in any one of a plurality of nodes according to an exemplary embodiment.

Referring to FIG. 4, a node receives a problem for mining through a mining program at step S110. In an exemplary embodiment, the problem for mining may include a problem requiring machine learning, and the corresponding node may receive input data for specific machine learning. The machine learning is one of artificial intelligence (AI) access methods, and may include deep learning which analyzes a large amount of data using a complex algorithm, recognizes a data pattern, and performs estimation based on the data pattern. According to another exemplary embodiment, the problem for mining may include a problem that the corresponding nodes can solve by providing computing power, i.e. process power. For example, the problem for mining may include problems in various areas requiring a supercomputer, such as the military area for a simultaneous engagement ability, weapon control and trajectory calculation for a plurality of targets, the scientific computing area including earth science, biology, chemistry and physics, the weather forecast area requiring the calculation of differential equations including various subjects such as earth science, physics and mathematics, and the stock prediction area.

According to the exemplary embodiment, the corresponding node may be a full node that stores a blockchain composed of blocks including block hash values.

At step S120, the node performs a proof-of-work process in order to solve the received problem. In an exemplary embodiment, the proof-of-work process may include machine learning. For example, the corresponding node may perform machine learning in order to improve its performance by performing learning and estimation, based on empirical data of various voices, faces and objects for AI techniques such as voice recognition (AI virtual secretary), facial recognition (filter function used in SNS) or object recognition (search function using an object image such as an apple or orange). According to another exemplary embodiment, the proof-of-work process may indicate that the corresponding node provides computing power, i.e.

processing power to compute or calculate problems in the military area, the scientific computing area, the weather forecasting area and the stock prediction area.

The corresponding node generates a transaction at the same time as the proof-of-work process, and transmits the generated transaction to the other nodes. In an exemplary embodiment, when the number of transactions which are generated by the corresponding node and accumulated in the node is equal to or more than a predetermined value, the node may transmit information on the transactions to the other nodes to share the information. Similarly, transactions generated by the other nodes may also be transmitted to the corresponding node.

When successfully performing the proof-of-work process, the corresponding node generates a block hash value. According to the exemplary embodiment, when one of the other nodes excluding the corresponding node successfully performs the proof-of-work process, the corresponding node receives a block hash value from the node having succeeded in the proof-of-work process. At step S130, the corresponding node determines the validities of the transaction and the block hash value, using a validity verification algorithm, and then creates a block using the transaction and the block hash value of which the validities have been verified.

At step S140, the corresponding node receives a reward corresponding to the proof-of-work process performed by the corresponding node through the mining program. According to the exemplary embodiment, the corresponding node may receive a reward for the work amount of the proof-of-work process performed by the corresponding node, regardless of whether the corresponding node has first succeeded in the proof-of-work process. The reward may include a crypto-currency, such as Bitcoin, Ethereum, Ripple, ACOIN, Dash, and BOScoin.

At step S150, the corresponding node updates the blockchain by connecting the created block to the blockchain. According to the exemplary embodiment, step S110 of receiving the problem through the mining program may be performed after the previous block has been generated or at predetermined time intervals. For example, in the case of Bitcoin, a problem is received at an interval of 10 minutes.

Figure 5:
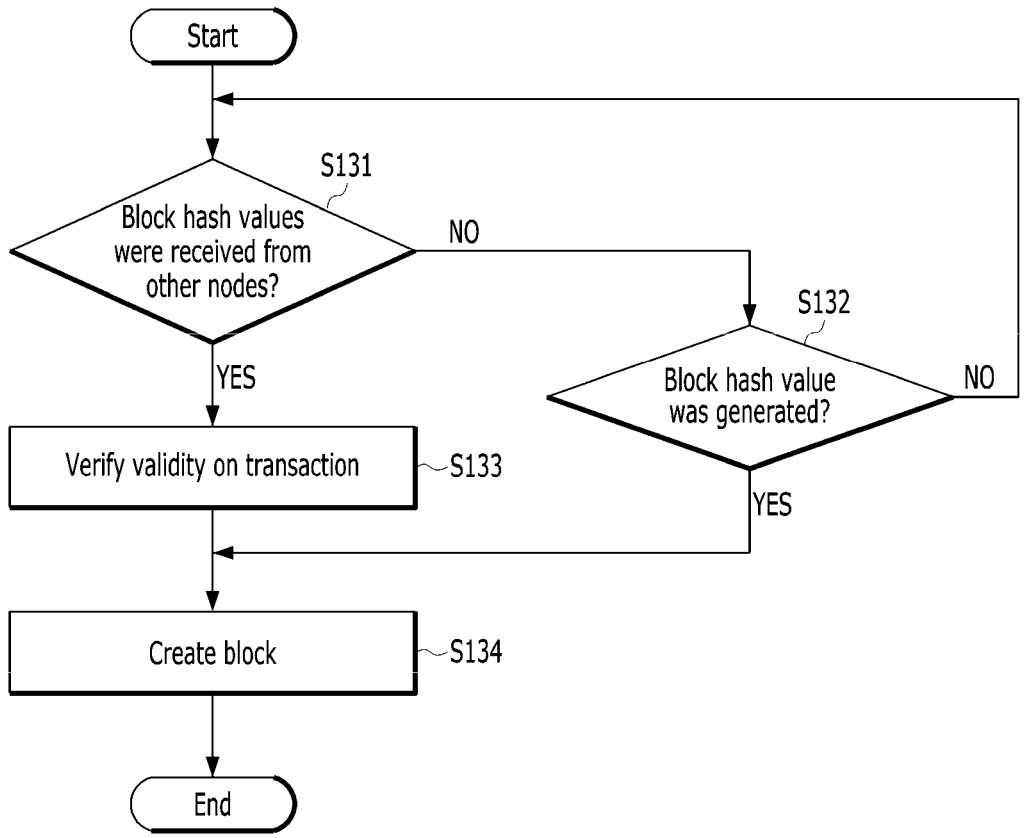
FIG. 5 is a flowchart of a step of creating block using transaction illustrated in FIG. 4, according to an exemplary embodiment.

FIG. 5 is a flowchart of the step S130 of creating block using transaction illustrated in FIG. 4.

Referring to FIG. 5, step S130 starts with step S131 of determining whether block hash values were received from the other nodes. That is, step S131 includes determining whether any one of the other nodes excluding the corresponding node has succeeded in the proof-of-work process. If any one of the other nodes first succeeded in the proof-of-work process, the corresponding node receives a block hash value from the node having succeeded in the proof-of-work process, and verifies the validities of the transaction and the block hash value using the validity verification algorithm. Then, the corresponding node creates a block using the transaction and the block hash value.

When no block hash values were received from the other nodes at step S131, the corresponding node determines whether a block hash value was generated, at step S132. That is, the corresponding node determines whether the corresponding node first succeeded in the proof-of-work process. When the corresponding node first succeeded in the proof-of-work process, the corresponding node creates a block using the transaction and the block hash value.

When no block hash value was generated at step S132, the procedure returns to step S131 because no nodes succeeded in the proof-of-work process.

As described with reference to FIG. 4, when the block is created at step S134, a reward corresponding to the proof-of-work process performed by the corresponding node is received through the mining program. According to the exemplary embodiment, although any one of the other node excluding the corresponding node has first succeeded in the proof-of-work process, the corresponding node may receive a reward for the work amount of the proof-of-work process performed by the corresponding node. For example, the reward may be received in proportion to the work amount of the proof-of-work process which is performed until the proof-of-work process is stopped. In an exemplary embodiment, since a plurality of nodes may succeed in the proof-of-work process, only nodes having a larger work amount than a preset minimum work amount may receive a reward. At this time, the minimum work amount may be set to ½ of the work amount of the node having succeeded in larger work amount. The reward may include a crypto-currency, such as Bitcoin, Ethereum, Ripple, ACOIN, Dash, and BOScoin.

Figure 6:
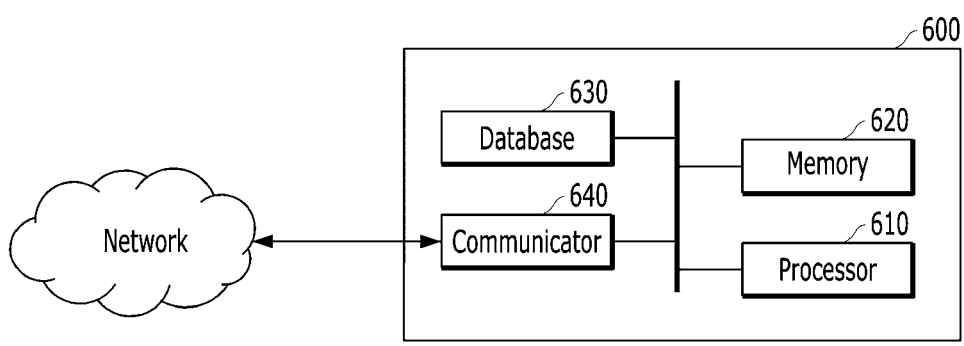
FIG. 6 is a block diagram illustrating a computer device for any one of the plurality of nodes in FIG. 1.

FIG. 6 is a block diagram illustrating a computer device suitable for any one of the plurality of nodes in FIG. 1.

Referring to FIG. 5, the computer device 600 includes a processor 610, a memory 620, a database 630 and a communicator 640.

The memory 620 may store program codes which provide various functions when executed by the processor 610. When the computer device 600 is employed in any one of the nodes 110, 120, 130, 140 150, 160, and 170, such program codes may provide the operations and/or functions described with reference to FIGS. 3 and 4, when executed by the processor 610. In addition, the program codes may provide one or more additional operations and/or functions when executed by the processor 610. Such program codes may be loaded from a recording medium which can be read by a computer separate from the memory 620, using a drive mechanism. The recording medium which can be read by such a separate computer may include one or more of various storage media such as a floppy disk drive, DVD/CD-ROM drive, hard disk drive and memory card. Alternatively, the program codes may be loaded to the memory 620 through the communicator 640 from an external device.

The database 630 may store the blockchain described with reference to FIG. 2. The processor 610 may store and update the blockchain through communication with the database 630, read information stored in the blockchain, and process the read information. FIG. 6 illustrates the database 630 as a component of the computer device 600. However, the exemplary embodiments are not limited thereto. For example, the database 630 may serve as a component outside the computer device 600, and the computer device 600 may communicate with the database 630 through the communicator 640.

The communicator 640 is configured to communicate with the network. The communicator 640 may communicate with one or more of the plurality of nodes 110, 120, 130, 140 150, 160, and 170 illustrated in FIG. 1 through the network.

In exemplary embodiments, the processor 610 and the communicator 640, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the processor 610 and the communicator 640, and/or one or more components thereof may include or otherwise be associated with one or more memories (not shown) including code (e.g., instructions) configured to cause the processor 610 and the communicator 640, and/or one or more components thereof to perform one or more of the features, functions, processes, etc., described herein.

According to the exemplary embodiments, the resource operating method for each of nodes communicating through a network and the computer device can use computing power in machine learning, the computing power being used in a blockchain mining process based on a proof of work, and compensate for the computing power. Some of the advantages that may be achieved by exemplary implementations of the invention and exemplary methods of the invention include preventing or reducing the waste of computer resources.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A resource operating method for each of a plurality of nodes communicating through a network, comprising:
   receiving a problem through a mining program, and performing a proof-of-work process to solve the received problem;
   generating a transaction and transmitting the generated transaction to the plurality of nodes during the proof-of-work process;
   generating and transmitting a block hash value at nodes that have successfully performed the problem of the proof-of-work process;
   receiving a transaction and the block hash value from nodes that have successfully performed the problem of the proof-of-work process;
   stopping the proof-of-work process at nodes that have not completed the problem of the proof-of-work process;
   verifying validity of the generated or received transaction using the block hash value to obtain a verified transaction;
   creating, in response to the transaction being verified, a block including information of the verified transaction;
   receiving a reward corresponding to the performed proof-of-work process through the mining program; and
   connecting the block to a blockchain,
   wherein the problem comprises application of computing power to solve a useful problem selected from the group consisting of machine learning, military calculations, scientific calculations, and differential equations.

2. The resource operating method of claim 1, further comprising storing the blockchain composed of blocks including block hash values.

3. The resource operating method of claim 1, wherein the receiving of the problem through the mining program comprises performing machine learning to solve a problem corresponding to the machine learning through the mining program, wherein the machine learning analyzes a large amount of data using a complex algorithm, recognizes a data pattern, and performs an estimation based on the data pattern.

4. The resource operating method of claim 1, wherein the receiving of the reward corresponding to the performed proof-of-work process through the mining program comprises receiving a reward in proportion to a work amount of the proof-of-work process until the proof-of-work process is stopped.

5. The resource operating method of claim 1, wherein the receiving of the reward corresponding to the performed proof-of-work process through the mining program comprises receiving a reward when a work amount of the proof-of-work process performed until the proof-of-work process is stopped is larger than a predefined minimum work amount.

6. The resource operating method of claim 5, wherein the minimum work amount is ½ of the work amount of a proof-of-work process performed by a node which first generates a block hash value among the plurality of nodes.

7. The resource operating method of claim 1, wherein the receiving of the reward corresponding to the performed proof-of-work process through the mining program comprises receiving a crypto-currency corresponding to the performed proof-of-work process through the mining program.

8. The resource operating method of claim 1, wherein the receiving of the problem through the mining program comprises:
   receiving the problem through the mining program after generating a previous block; and
   performing a proof-of-work process.

9. The resource operating method of claim 1, wherein the receiving of the problem through the mining program comprises:
   receiving the problem through the mining program at predetermined time intervals; and
   performing a proof-of-work process.

10. A resource operating method for each of a plurality of nodes communicating through a network, comprising:
    performing machine learning to solve a problem corresponding to the machine learning through a mining program;
    generating a transaction and transmitting the generated transaction to the plurality of nodes during the performed machine learning;
    receiving a transaction from the plurality of nodes;
    generating a block hash value at a node that has successfully solved the problem corresponding to the machine learning, and creating a block for information of the generated or received transaction using the generated block hash value;
    transmitting the block hash value to the plurality of nodes;
    receiving a reward corresponding to the performed machine learning through the mining program; and
    connecting the block to a blockchain,
    wherein the performed machine learning analyzes a large amount of data using a complex algorithm, recognizes a data pattern, and performs an estimation based on the data pattern.

11. The resource operating method of claim 10, further comprising storing the blockchain composed of blocks including block hash values.

12. The resource operating method of claim 10, wherein the receiving of the reward corresponding to the performed machine learning through the mining program comprises receiving a crypto-currency corresponding to the performed machine learning through the mining program.

13. A computer device operating as any one of a plurality of nodes communicating through a network, comprising:
- a communicator configured to communicate with the network; and
- one or more processors connected to the communicator, wherein the one or more processors are configured to:
- receive a problem through a mining program and perform a proof-of-work process to solve the received problem;
- generate a transaction and transmit the generated transaction to the plurality of nodes during the proof-of-work process;
- generate and transmit a block hash value at nodes that have successfully performed the problem of the proof-of-work process;
- receive a transaction and the block hash value from the plurality of nodes that have successfully performed the problem of the proof-of-work process;
- stop the proof-of-work process at nodes that have not completed the problem of the proof-of-work process;
- verify validity of the generated or received transaction using the block hash value to obtain a verified transaction;
- create a block when the validity is verified;
- receive a reward corresponding to the performed proof-of-work process through the mining program; and
- connect the block to a blockchain,
- wherein the problem comprises application of computing power to solve a useful problem selected from the group consisting of machine learning, military calculations, scientific calculations, and differential equations.

14. The computer device of claim 13, wherein the problem comprises a problem corresponding to machine learning, and wherein the proof-of-work process comprises machine learning that analyzes a large amount of data using a complex algorithm, recognizes a data pattern, and performs an estimation based on the data pattern.

15. The computer device of claim 13, wherein the reward corresponding to the performed proof-of-work process comprises a crypto-currency.

16. A computer device operating as any one of a plurality of nodes communicating through a network, comprising:
- a communicator configured to communicate with the network; and
- one or more processors connected to the communicator, wherein the one or more processors are configured to:
- perform machine learning to solve a problem corresponding to the machine learning through a mining program;
- generate a transaction and transmit the generated transaction to the plurality of nodes during the performed machine learning;
- receive a transaction from the plurality of nodes;
- generate a block hash value at a node that has successfully solved the problem corresponding to the machine learning, and create a block for information of the generated or received transaction using the generated block hash value;
- transmit the block hash value to the plurality of nodes;
- receive a reward corresponding to the performed machine learning through the mining program; and
- connect the block to a blockchain,
- wherein the performed machine learning analyzes a large amount of data using a complex algorithm, recognizes a data pattern, and performs an estimation based on the data pattern.

17. The computer device of claim 16, wherein the reward corresponding to the performed machine learning comprises a crypto-currency.

* * * * *